May 24, 1938. P. T. LANDSEM 2,118,048
LAMINATED STRUCTURE
Filed March 29, 1937
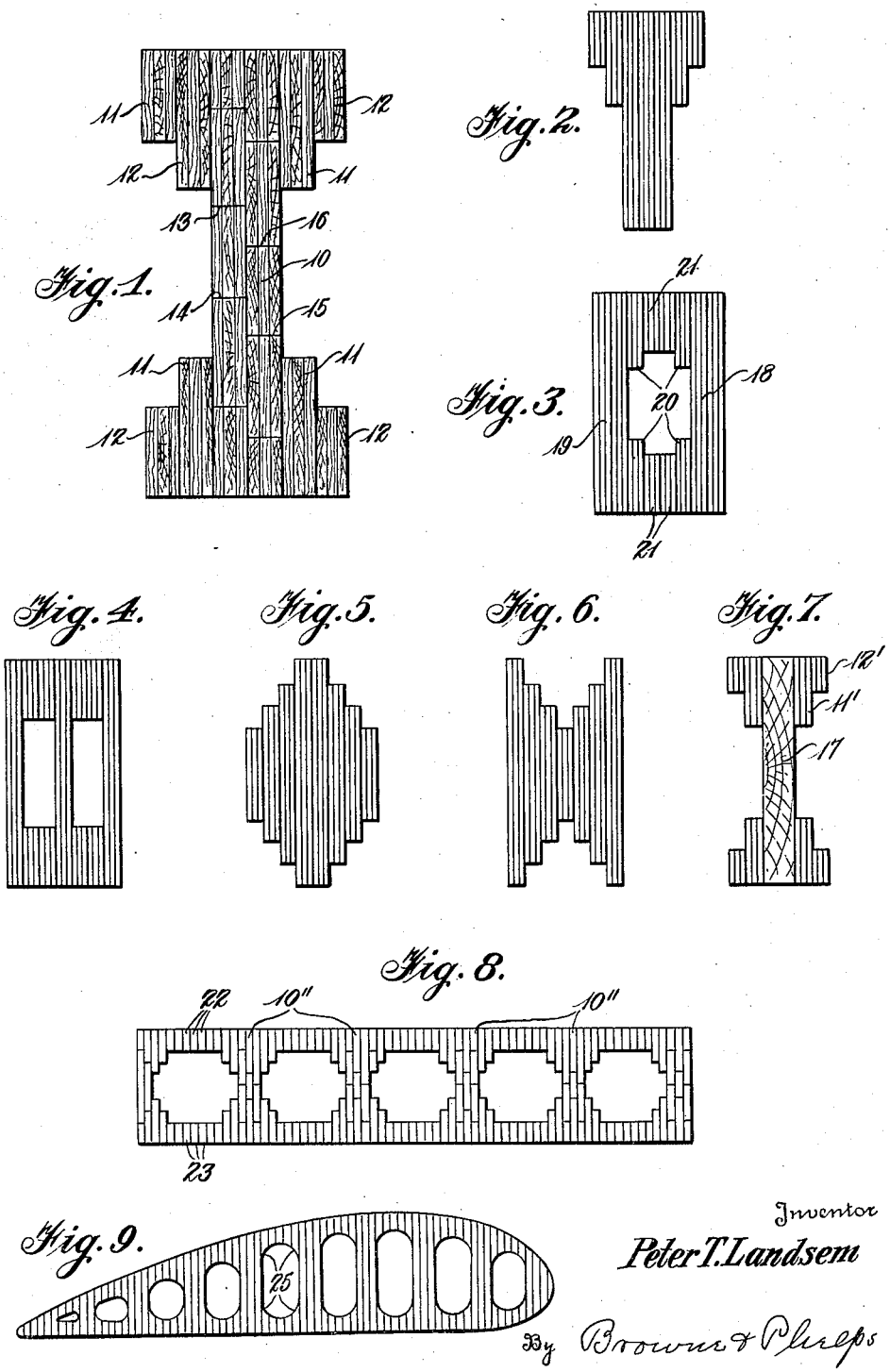

Patented May 24, 1938

2,118,048

UNITED STATES PATENT OFFICE 2,118,048

LAMINATED STRUCTURE

Peter T. Landsem, Washington, D. C., assignor to Timber Engineering Company, Washington, D. C., a corporation of Delaware Application March 29, 1937, Serial No. 133,739

4 Claims. (Cl. 20—91)

The invention relates to improvements in laminated wood structures, and has as an object the provision of a structural load carrying member made up of laminations.

It is a further object of the invention to provide a laminated structure of the character described made of plywood or largely of plywood—the laminations being secured together by a hardened adhesive.

It is a further object of the invention to provide a structure of the class described which because made of plywood laminations may be readily and assuredly designed to meet the stresses expected in service.

Further objects of the invention will appear from the following description when read in connection with the accompanying drawing showing physical embodiments of the invention, and wherein Figure 1 is an end view of a structural member embodying the invention.

Figures 2, 3, 4, 5, 6 and 7 are like views of other forms of structural members.

Figure 8 is an end view of a structure embodying the principles of the invention, and Figure 9 is an end view of a box girder made in the form of an airfoil.

As shown in Figure 1, the member which corresponds to an I-structural shape is made up of a core comprising laminations 10 and stiffening laminations 11, 12 constituting compression and tensioning stiffening members corresponding to the flanges of a steel I-beam. The core 10 may be made of laminations extending continuously through the height of the member or may be made up of separate strips divided as shown at joints 13, 14, 15, 16, and so forth, the joints between the separate strips in the respective laminations being preferably staggered in accordance with good mechanical practice. As indicated in this figure, the laminations are each made of plywood in which, as is well known, the grain in adjacent layers is out of parallel, desirably at right angles of each other. The stiffening laminations 11 and 12 are also shown as made of plywood.

It results from this structure that the member can be designed to meet the expected stresses with the assurance that the strength of the member will be as designed, since a slight defect in any one of the layers of the plywood will not be continuous throughout the thickness of the lamination. The width of the successively narrower laminations 11 and 12 may be whatever is necessary to meet the expected stresses and to develop the strength required for any particular service. It is obvious that the projecting corners of the laminations 11, 12 may be cut away to produce a curved outline in cross section of the respective sides of the member.

It is possible for some services to make the core 10 of a single piece of timber as indicated at 17, Figure 7, while making the stiffening members 11'—12' of plywood.

In Figure 2 is shown a form of the invention corresponding to a T-beam. In Figure 3 is shown a hollow beam comprising the external core member 18, 19 and internal stiffening laminations 20 with upper and lower members 21 completing the shape. The number of the stiffening members 20 may be increased as well as the number of the members 21 in the manner illustrated in the structure of Figure 8.

Figures 4, 5 and 6 show other forms which may be constructed in accordance with the invention, it being understood that the various laminations thereof are formed of plywood. The structure of Figure 8 is a made up of a plurality of members corresponding to the single shape of Figure 3 united into a continuous structure by the upper and lower tension and compression laminations 22, 23, and of the cores 10″, the whole being desirably formed of plywood, the laminations secured together by hardened adhesive.

When the structure of Figure 8 is utilized as a box girder the upper portions of the cores 10″ will be in compression and the lower portion thereof in tension in accordance with well known principles of mechanics, and the central portion thereof will be neutral. Therefore, as will be readily appreciated, openings may be formed in the central portions of the cores without weakening the structure, thereby providing what is known as a Verendeel truss.

Figure 9 illustrates one use to which the invention may be applied—that of a sustaining surface for an airplane in the form of an airfoil. In this form for lightness, the interior of the opening spaces or passages are formed upon curved lines at 25 by cutting away the corners of the stiffening members corresponding to 11 and 12 of Figure 1, which lightening of the structure may be accomplished without substantial decrease in strength.

Considering the invention as applied to the structure of Figure 8, it will be seen that not only are the tension and compression stresses amply met but that stresses tending to overturn the cores are also met by the presence and shape of the successively narrow portions corresponding to 11 and 12 of Figure 1.

It has heretofore been proposed to form structural members of laminations of lumber placed edgewise to the bending stresses and secured together by nails or bolts and timber connectors, but in this form of structure the full strength is not developed for the reason that the laminations between the connecting elements each act independently. When the laminations are made up of plywood and are secured together by a hardened adhesive the full strength of all elements of the structure is developed, and the entire structure may be designed with assurance that the strength will be that for which it is designed. If the adhesive is insoluble in water the structure may be used for substantially any purpose for which metal or concrete is now used and will produce an exceedingly strong and light structure.

The structure shown in section in Figure 8 may be a box girder as above indicated, or it may be a section of an arch taken in a plane passing through the axis of the arch.

Minor changes may be made in the physical embodiment of the invention without departing from the spirit thereof.

I claim:

1. A load carrying structural member comprising: a plurality of laminae of wood at least one thereof extending throughout the height and length of the member; other of the laminae of less width and bonded to the first named and to each other; the width of the narrower laminae varying in progressively stepped relation as the cores are approached and in accordance with the stresses to be met at their portion of the member; said laminae composed of laminations of wood bonded together with the grain of adjacent laminations out of parallel.

2. A load carrying structural member comprising: a core of laminations of wood extending throughout the height and length of the member; stiffening laminae superposed upon said core at portions thereof to meet stresses of service; said superposed laminae progressively narrower as their spacing from the core increases; each of said laminae formed of plywood and the whole bonded together by hardened adhesive.

3. A load carrying structural member of box girder form comprising: a plurality of cores extending throughout the thickness of the girder and formed of a plurality of laminations of plywood; a plurality of laminations of plywood of less width connecting said cores and forming the top and bottom members of the girder; certain of the last named laminations progressively increasing in width as the said cores are approached; each of said laminations bonded to the adjacent laminations by hardened adhesive.

4. The structure of claim 2 with its external surfaces of airfoil form.

PETER T. LANDSEM.